(12) United States Patent
Bruck et al.

(10) Patent No.: US 9,769,618 B1
(45) Date of Patent: Sep. 19, 2017

(54) ON-DEMAND MOBILE DEVICE LOCATION POLLING

(71) Applicant: Google Inc., Mountain View, CA (US)

(72) Inventors: Timo Bruck, Mountain View, CA (US); Mark Rajan Malhotra, San Mateo, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/065,712

(22) Filed: Mar. 9, 2016

(51) Int. Cl.
*H04W 4/02* (2009.01)
*H04L 29/08* (2006.01)
*H04M 1/725* (2006.01)

(52) U.S. Cl.
CPC .............. *H04W 4/025* (2013.01); *H04L 67/26* (2013.01); *H04M 1/72533* (2013.01); *H04W 4/021* (2013.01)

(58) Field of Classification Search
CPC . H04W 4/025; H04W 4/021; H04M 1/72533; H04L 67/26
See application file for complete search history.

(56) References Cited

U.S. PATENT DOCUMENTS

| 7,257,397 | B2 * | 8/2007 | Shamoon | G01D 21/00 455/410 |
| 9,020,533 | B1 * | 4/2015 | Mangiardi | H04W 64/003 370/310 |
| 2010/0183134 | A1 * | 7/2010 | Vendrow | H04M 3/42348 379/201.06 |
| 2010/0201536 | A1 * | 8/2010 | Robertson | G07C 9/00904 340/686.6 |
| 2013/0083805 | A1 * | 4/2013 | Lu | H04L 12/2807 370/401 |
| 2013/0189946 | A1 | 7/2013 | Swanson | |
| 2014/0266699 | A1 * | 9/2014 | Poder | G08B 25/001 340/539.13 |
| 2015/0195100 | A1 * | 7/2015 | Imes | H04L 12/282 455/420 |
| 2015/0334768 | A1 * | 11/2015 | Ranasinghe | H04W 24/10 370/328 |
| 2015/0365796 | A1 * | 12/2015 | Toni | H04W 4/022 701/522 |
| 2016/0019780 | A1 * | 1/2016 | Gettings | G08C 17/02 340/12.5 |
| 2016/0313750 | A1 * | 10/2016 | Frenz | G05D 23/1393 |

FOREIGN PATENT DOCUMENTS

EP 2672740 A2 12/2013

OTHER PUBLICATIONS

Extended European Search Report dated Jun. 20, 2017 as received in Application No. 16205747.5.

* cited by examiner

*Primary Examiner* — Ajit Patel
(74) *Attorney, Agent, or Firm* — Morris & Kamlay LLP

(57) ABSTRACT

A home management system comprises a controller configured to determine that a status of a particular mobile device registered with the home management controller is of concern; transmit to the particular mobile device a request notification to enable the registered mobile device to determine a device location in the background; receive a location notification from the particular mobile device in response to the request notification; and based on the received location notification, determine the status of the particular mobile device.

16 Claims, 4 Drawing Sheets

ON-DEMAND MOBILE DEVICE LOCATION POLLING

BACKGROUND

Many different smart home applications require intimate knowledge of the occupancy state of the home: whether the home is vacant or occupied, and, if occupied, which users are home. In addition to sensors embedded in home devices that provide occupancy signals, the location of associated mobile devices can be used to estimate whether particular individuals are at home, or away from the home. Depending on the target applications, the setup of devices at home, and various states of the home, each source of occupancy information has relative importance and performance, so the configuration of each source may be adjusted to optimize its value.

A number of the applications rely on GeoFencing or similar OS-based location services to trigger behaviors either on the mobile device itself (e.g., smartphone) or on other associated system products. GeoFencing, though, relies on the mobile OS to trigger events based on a respective GeoFence. As such, many common failure modes of a mobile device are undetectable by applications that use these triggers. In this case, the location of the mobile device, if not triggering a GeoFence, is unknown.

BRIEF SUMMARY

According to an embodiment of the disclosed subject matter, a method for determining a mobile device status comprises determining by a home management controller that a status of a particular mobile device registered with the home management controller is of concern; transmitting, by the home management controller, to the particular mobile device a request notification to enable the registered mobile device to determine a device location in the background; receiving, by the home management controller, a location notification from the particular mobile device in response to the request notification; and based on the received location notification, determining, by the home management controller, the status of the particular mobile device.

In an aspect of the embodiment, the method further comprises detecting a failure of the home management controller to receive the location notification; and based on the failure to receive the location notification, determine the status of the particular mobile device to be nonoperational.

In an aspect of the embodiment, the method further comprises determining whether the status of the particular mobile device triggers a system behavior.

In an aspect of the embodiment, the method further comprises performing an appropriate system behavior when the status of the particular mobile device triggers the system behavior.

In an aspect of the embodiment, the system behavior includes one or more of the following: forwarding another registered mobile device the status of the particular mobile device, disarming an auto-arm security system, arming an auto-arm security system, activating or deactivating an HVAC system, activating or deactivating one or more cameras, activating or deactivating one or more sensors.

In an aspect of the embodiment, the determining that the status of the particular mobile device is of concern, includes one or more of: the registered mobile device not triggering a boundary of a GeoFence at a certain time, the registered mobile device not being in contact with the home management controller for a long time; another user interacting with the home management controller, something unusual happening within a premises of the user.

In an aspect of the embodiment, the request notification is a push notification.

In an aspect of the embodiment, the push notification is a content-available push notification.

In an aspect of the embodiment, the home management controller is included in a smart-home environment.

In an aspect of the embodiment, the status of the particular device is included in an occupancy estimate of the smart-home.

According to an embodiment of the disclosed subject matter, a home management system comprises a controller configured to determine that a status of a particular mobile device registered with the home management controller is of concern; transmit to the particular mobile device a request notification to enable the registered mobile device to determine a device location in the background; receive a location notification from the particular mobile device in response to the request notification; and based on the received location notification, determine the status of the particular mobile device.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
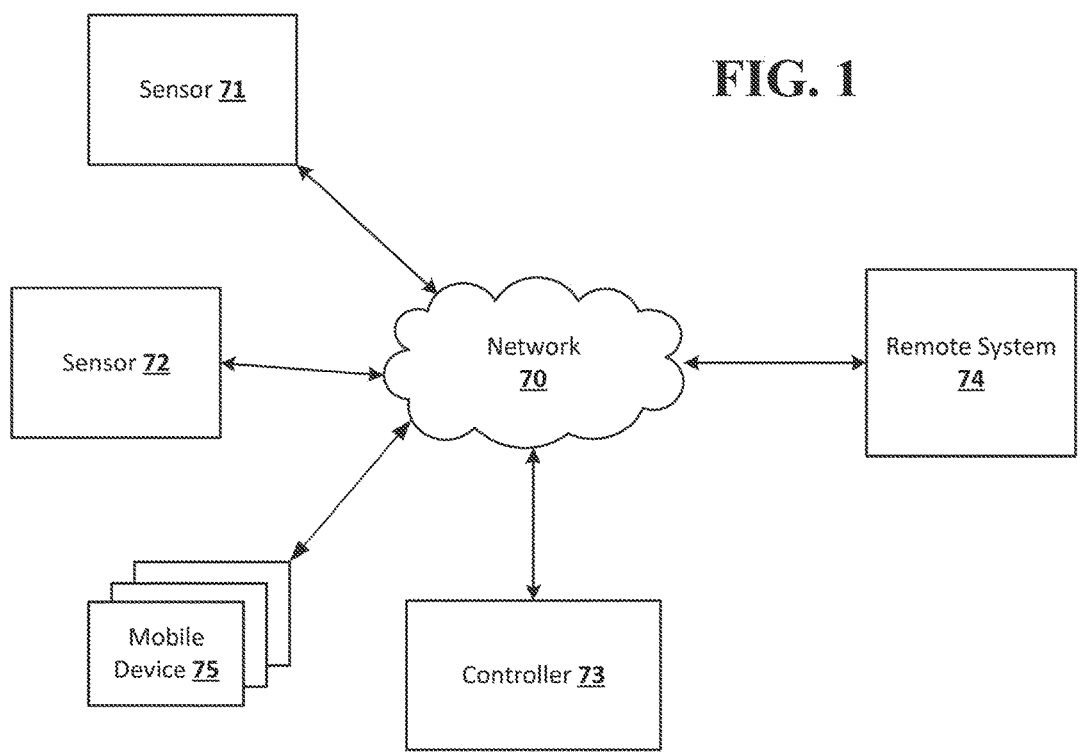
FIG. 1 shows an example system according to an embodiment of the disclose subject matter.

According to embodiments of the disclosed subject matter, a home management system may affirmatively request the location of a mobile device to determine the status of the mobile device. The home management system may determine that a status/location of one or more registered computing devices, e.g., a user mobile device, has not been determined, contrary to a learned pattern of operation of the mobile device. For example, a registered mobile device may not have been detected as leaving or entering a monitored location for an unusual amount of time, leaving or entering a monitored location at a certain time of day or within a regularly scheduled time frame. The failure of the detection of the mobile device's status, therefore, may trigger the home management system to poll the registered mobile device for its location. For example, the home management system may use a push notification to the registered mobile device, such as a content-available push notification, to enable the mobile device to perform background location determination and reporting. Upon receipt of the mobile device location, the home management system may determine the status of the mobile device and trigger an appropriate system behavior based on the determine status. A lack of response by the mobile device may also trigger an appropriate system behavior by the home management system.

The disclosed home management system may utilize occupancy information to operate systems within a smart home environment. The environment may be, for example, a home, office, apartment, condominium, or other structure, and may include a combination of enclosed and open spaces. e.g., a home or office. The occupancy information may be gathered from a number of sources, including sensors that monitor the environment for indications that persons and animals are present or absent from the environment. The sensors may be, for example, low power motion sensors, such as passive infrared sensor used for motion detection, light sensors, cameras, microphones, entryway sensors, smart light switches, mobile device scanners for detecting the presence of mobile computing devices or fobs via WiFi, Bluetooth, and RFID, and the like.

Occupancy information may also be obtained via mobile devices registered with the home management system. For example, GeoFencing or similar location based services may be used by the mobile device and home management system to determine whether a user associated with the mobile device is home or away, and whether a structure is occupied by a user. When a mobile device crosses the boundary of a GeoFence, the mobile device may assert the status of the GeoFence to the home management system. For example, a mobile device that returns home may trigger the mobile device to assert to the home management system that the mobile device has crossed the GeoFence associated with the home, thereby indicating that the user associated with the mobile device has returned home.

The home management system may be any suitable computing device for managing the smart home environment, including a security system of a smart home environment and automation system including other functions beyond security. The home management system may be a controller for a smart home environment, and may include a machine learning system with an occupancy model. The machine learning system may be any suitable machine learning system for using the occupancy signals to generate an occupancy estimate. The machine learning system may be, for example, a Bayesian network, artificial neural network, support vector machine or any other suitable statistical or heuristic machine learning system type. The occupancy model may be, for example, a set of weights or vectors suitable for use with the machine learning system. The machine learning system may be supervised or unsupervised, and may implement any suitable combination of online and offline learning.

For example the machine learning system may be trained through feedback from a user of the smart home environment, as the machine learning system may produce occupancy estimates which may be corrected by the user until the occupancy model of the machine learning system is accurate enough to no longer require feedback. Supervised learning of the machine learning system may also be governed by a set of rules for sensor input, which may be used to correct occupancy estimates of the machine learning system and adjust the occupancy model. For example, the machine learning system may generate an occupancy estimate based on signals from the various sensors in the smart home environment which includes an estimate (i.e., a determination) that a person is in a basement. A rules-based interpretation of signals from the basement may contradict this estimate. For example, signals from an entryway sensor may indicate that the basement door is closed and has not been opened recently, and no motion may have been detected in the basement. The occupancy estimate from the machine learning system may be corrected, and the occupancy model may be updated based on the correction, further training the machine learning system.

The machine learning system may also be pre-trained. For example, the home management system may come installed with a pre-trained occupancy model, which may have been trained in a general environment similar to the environment in which it is installed. For example, a home management system used for a free-standing house may have an occupancy model based on a generic free-standing house, which may differ from an occupancy model for a generic apartment or office.

The occupancy estimate generated by the machine learning system of the home management system may include estimates for how many people are in the environment, whether they are residents or guests, where they are in the environment, whether they have recently entered or exited the environment, and an estimate of when they may be entering or exiting the environment. For example, in a house owned by a family with two adults, two children, and one dog, the occupancy estimate may include estimates of the locations of each of the adults and children and the dog. For example, during the early afternoon on a weekday, the occupancy estimate may indicate that the two adults who are residents of the house are not present, the two children are present, a person who is a guest is present, and the dog is present. The occupancy estimate may also indicate that the two adults are expected to return to the house around 6:30 pm that evening.

FIG. 1 shows an example of a smart-home environment as disclosed herein, which may be implemented over any suitable wired and/or wireless communication networks. Referring to FIG. 1, one or more sensors 71, 72 may communicate via a local network 70, such as a Wi-Fi or other suitable network, with each other and/or with a home management controller 73. The controller 73 may be a computing device, such as a general- or special-purpose computer. The controller 73 may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 1 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 1.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 1, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 1, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 1 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 1. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may include one or more of the sensors 71, 72 shown in FIG. 1. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 1 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 1 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view, arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment. In the disclosed implementation, the electronic device may be one or more mobile devices 75, belonging to each of the registered occupants of the smart-home environment.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

As disclosed above, the occupancy estimate includes all mobile devices 75 registered for the premises of the smart-home environment. In accordance with an implementation of the disclosed subject matter, the estimated and current status, i.e., location, of each of the registered mobile device 75 may be known by the controller 73 and utilized as an input for managing the smart-home environment. For example, the status of the mobile devices may be used to determine whether to activate/deactivate an auto-alarm system, active/deactivate cameras and sensors on the premises.

Because the status of the mobile device 75 is one of plurality of occupancy signals that may be used by the controller 73 to determine the state of the premises, the controller 73 may deem it necessary to request the location of a particular one or more registered mobile device(s) 75, for example when the controller 73 has become concerned about the status of a particular registered mobile device. The controller 73, therefore, may deem it necessary to request the status (i.e., the location) of the mobile device 75. For example, the controller may become concerned about a particular mobile device and deem it necessary to poll the mobile device for any of the following reasons including, but not limited to: uncertainty is high as to the user's location estimate, contact with the mobile device has not occurred for a predetermined amount of time, something unusual is happening, or has been detected, on the premises (e.g., motion detected in the middle of the night or motion is detected during a time of day that the premises is typically to be empty), or another user is interacting with the system.

When the controller 73 deems it necessary to request the status of a mobile device 75, the controller 73 may transmit a request notification to the mobile device 75 that requests the mobile device provide its current location. The request notification may be any polling message that indicates to the mobile device to determine and transmit its current location. In a disclosed implementation, the request notification may be a push notification, e.g., content-available push notification, that enables the background location determination by the mobile device for a limited amount of time, and reporting its position back to the controller 73, via HTTP, for example. A push notification is a mechanism for computing devices, for example, servers, to transmit information, such as a message or state changes, to a mobile device. Content-available notifications do not necessarily elicit a user-facing UI upon receipt by the mobile device, which reduces the power impact of the request.

The mobile device 75, upon receiving the request notification, may initiate determining its current location using known methods, for example, GPS, triangulation, etc. The determined location is then reported to the controller 73 in a location notification. When the mobile device is unable to determine its location, the location notification indicates the location could not be determined to the controller 73; for example, the user may have disabled the mobile device's location services, the mobile device is unable to determine the location within a building, and the like.

The controller 73 may receive the location notification, including the location, from the mobile device 75. The controller 73 may then determine the status of the mobile device based on the received location notification. For example, the controller 73 may determine that the mobile device is still on the premises, at the user's office, etc.

If the location notification indicates that the location of the mobile device was unable to be determined, the controller 73 may determine that the mobile device has disabled location services, or is in a place where the location cannot be determined.

In an implementation, the controller 73 may determine that the mobile device has a dead battery, no connectivity, or notification services, for example, or has been disconnected by the user, when the controller 73 has not received a location notification within a predetermined amount of time after the request notification has been transmitted to the mobile device 75.

The controller 73 may then use the determined status to trigger a system behavior. For example, if the status of the mobile device is determined to have been on the premises and not moved, the controller may determine that the user of the mobile device has not left the room with the device, and therefore, may be ill. Upon such a determination, the controller may implement a system behavior that notifies another registered mobile device that the user of the mobile device may not have left the home, and disable the cameras from recording within the premises since an occupant is present in the house. The auto-away feature of the security system may be deactivated, the HVAC system may be activated to maintain a temperature associated with occupants being on the premises, etc.

In an implementation, a system behavior, for example, may include the controller performing one or more of the following: notifying another mobile device that a child associated with the registered mobile device has/has not returned home at the expected time, e.g., from school or a friend's house; arming/disarming of an Auto-Away and Auto-Arm feature of a security system based on the status of the mobile device; activate/deactivate cameras within the premises; activate/deactivate one or more sensors within the premises; adjust an HVAC system to control the environment within the premises; and notify users/occupants of malfunctioning/disabled mobile device.

It should be noted that although example system behaviors have been disclosed, other system behaviors may be implemented that may utilize the status of the polled mobile device. As disclosed above, a registered mobile device is polled when determined to be necessary by the controller.

Figure 2:
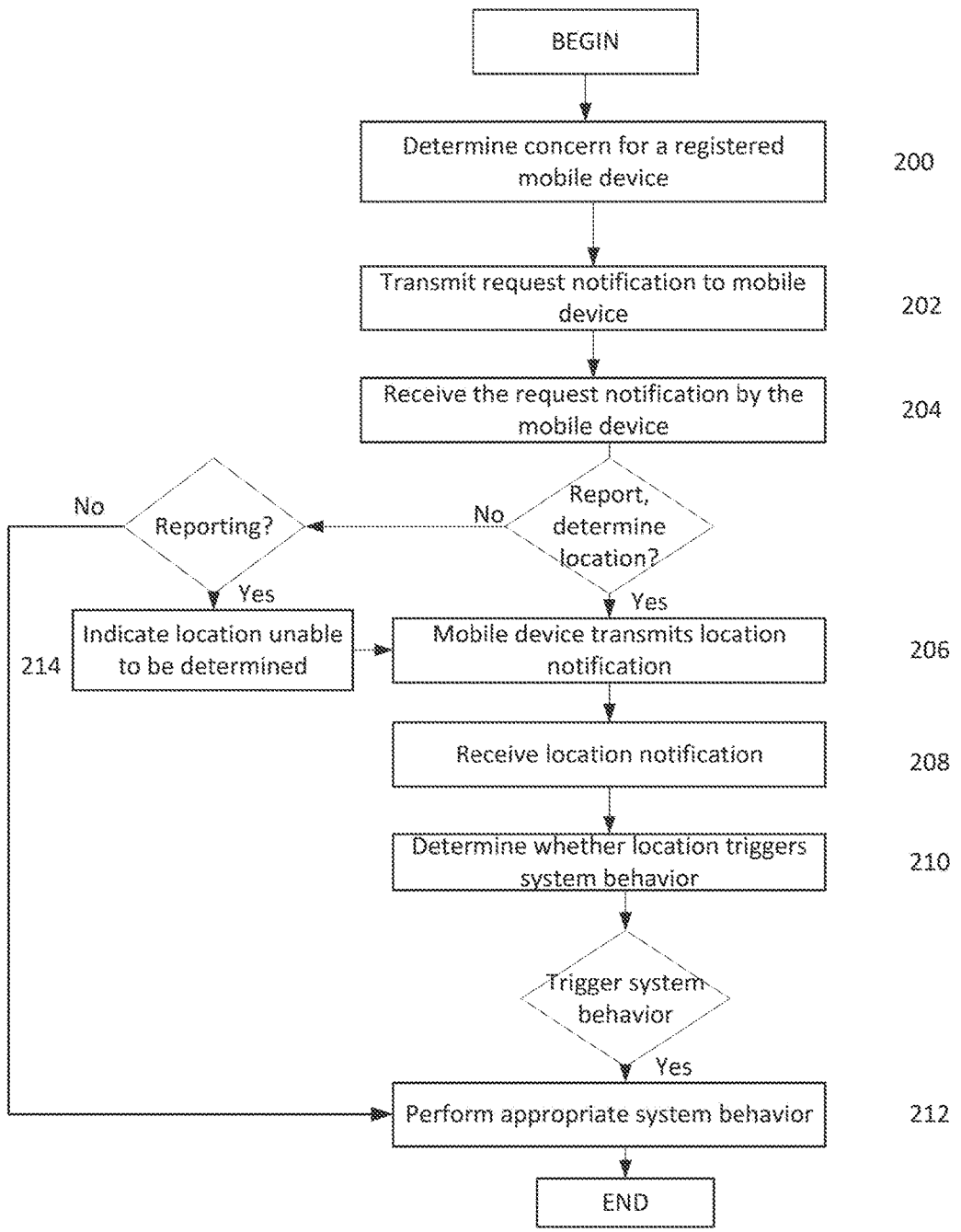
FIG. 2 shows an example flow diagram according to an embodiment of the disclosed subject matter.

An example flow diagram of an implementation of the disclosed system and method is shown in FIG. 2. A home management system/controller may be concerned about the status of a particular mobile device registered with the management system (200). The controller may then poll the concerning mobile device via transmitting a request notification to the mobile device that enables the registered mobile device to determine the device's location in the background (202).

The mobile device may receive the request notification from the controller (204). If the mobile device determines that it is capable of reporting the determining and reporting its location, the mobile determines its location and reports the location in a location notification that is transmitted to the controller (206).

When the controller receives the location notification from the mobile device (208), the controller, based on the received location notification, determines whether the location of the mobile device triggers a system behavior (210).

If a system behavior is determined to be triggered by the mobile device's location, the appropriate system behavior is performed (212).

If the mobile device is not capable of determining its location, the mobile device may transmit the location notification indicating that its location was unable to be determined (214). When the controller receives the location notification from the mobile device (208), the controller, based on the indication that the mobile device's location was unable to be determined in the received location notification, performs an appropriate system behavior (212).

The controller, upon polling the mobile device, waits a predetermined amount of time for receiving the location notification from the mobile device. If the predetermined amount of time has lapsed, the controller determines that the mobile device did not receive the request notification, the mobile is turned off, and/or the mobile phone is not capable of reporting and determining its location. Upon making this determination, the controller performs an appropriate system behavior based on the determined mobile device status (212).

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 3:
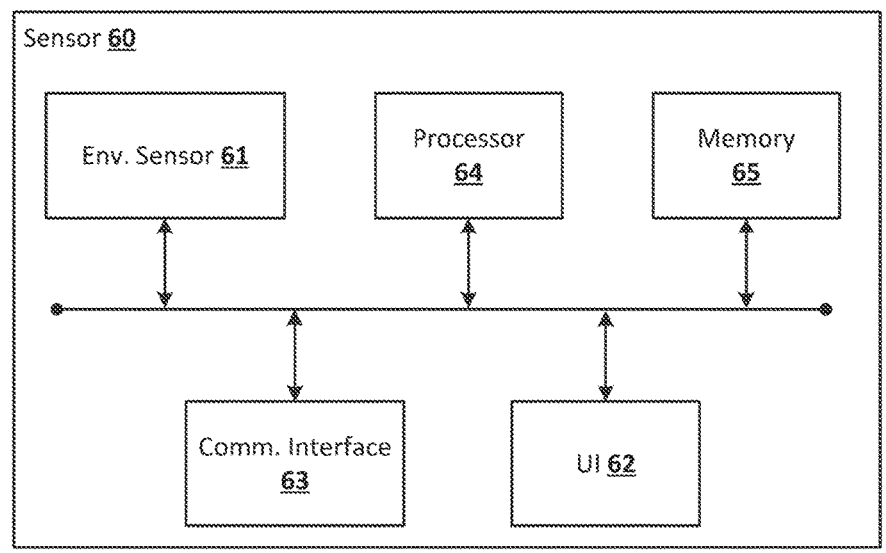
FIG. 3 shows an example sensor according to an embodiment of the disclosed subject matter.

A sensor may include hardware in addition to the specific physical sensor that obtains information about the environment. FIG. 3 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Referring back to FIG. 1, a smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 4:
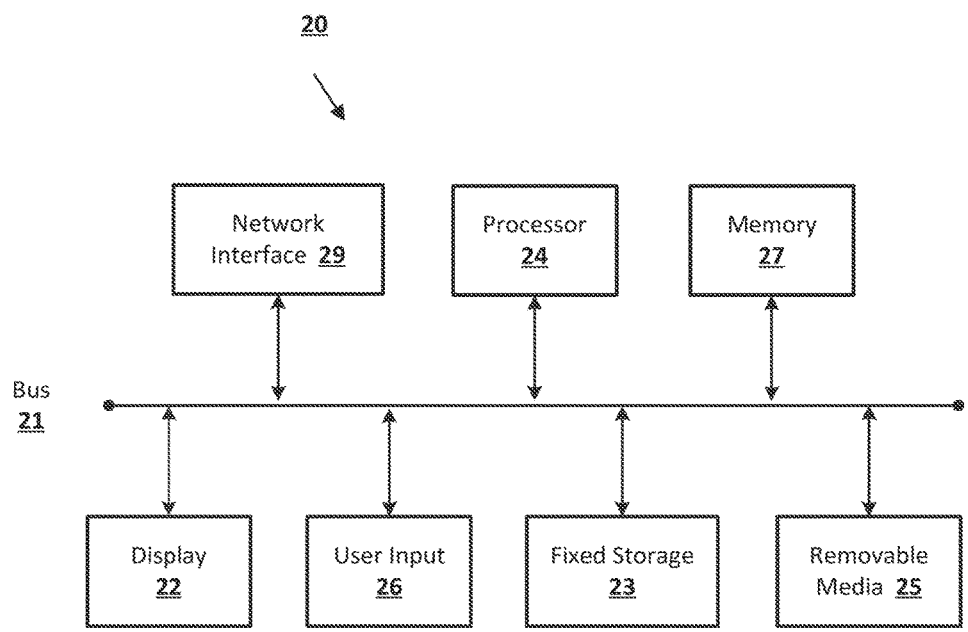
FIG. 4 shows an example computing device according to an embodiment of the disclosed subject matter.

Embodiments of the presently disclosed subject matter may be implemented in and used with a variety of computing devices. FIG. 4 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for determining a mobile device status comprising:
   determining by a home management controller that a status of a particular mobile device registered with the home management controller is of concern;
   transmitting, by the home management controller, to the particular mobile device a request notification to request the particular mobile device to determine a device location;
   waiting for a predetermined amount of time for a location notification from the particular mobile device in response to the request notification;
   determining, by the home management controller, the status of the particular mobile device to be nonoperational or unavailable when the home management controller fails to receive the location notification within the predetermined amount of time;
   determining, by the home management controller, the status of the particular mobile device to be operational or available based on the location notification when the location notification is received within the predetermined amount of time; and
   determining whether the status of the particular mobile device triggers a system behavior,
   wherein the system behavior is an action taken by the system to control a component of the system.

2. The method of claim 1, further comprising performing a particular system behavior when the status of the particular mobile device triggers the particular system behavior.

3. The method of claim 1, wherein the system behavior includes one or more of the following: forwarding to another registered mobile device the status of the particular mobile device, disarming an auto-arm security system, arming an auto-arm security system, activating or deactivating an HVAC system, activating or deactivating one or more cameras, and activating or deactivating one or more sensors.

4. The method of claim 1, wherein the determining that the status of the particular mobile device is of concern, includes one or more of: determining that the registered mobile device not triggering a boundary of a GeoFence at a certain time; determining that the registered mobile device not being in contact with the home management controller for a long time; determining that another user interacting with the home management controller; and determining that something is happening within a premises of the user.

5. The method of claim 1, wherein the request notification is a push notification.

6. The method of claim 5, wherein the push notification is a content-available push notification.

7. The method of claim 1, wherein the home management controller is included in a smart-home environment.

8. The method of claim 7, wherein the status of the particular device is included in an occupancy estimate of the smart-home.

9. A home management system comprising:
   a controller configured to:
      determine that a status of a particular mobile device registered with the home management controller is of concern;
      transmit to the particular mobile device a request notification to request the particular mobile device to transmit a location notification;
      wait for a predetermined amount of time for the location notification from the particular mobile device in response to the request notification;
      determine, by the home management controller, the status of the particular mobile device to be nonoperational or unavailable when the home management controller fails to receive the location notification within the predetermined amount of time;
      determine the status of the particular mobile device to be operational or available based on the location notification when the location notification is received within the predetermined amount of time; and
      determine whether the status of the particular mobile device triggers a system behavior, wherein the system behavior is an action taken by the system to control a component of the system.

10. The system of claim 9, wherein the controller is further configured to perform a particular system behavior when the status of the particular mobile device triggers the particular system behavior.

11. The system of claim 9, wherein the system behavior includes one or more of the following: forwarding to another registered mobile device the status of the particular mobile device, disarming an auto-arm security system, arming an auto-arm security system, activating or deactivating an HVAC system, activating or deactivating one or more cameras, and activating or deactivating one or more sensors.

12. The system of claim 9, wherein the determining that the status of the particular mobile device is of concern, includes one or more of: determining that the registered mobile device not triggering a boundary of a GeoFence at a certain time; determining that the registered mobile device not being in contact with the home management controller for a long time; determining that another user interacting with the home management controller; and determining that something is happening within a premises of the user.

13. The system of claim 9, wherein the request notification is a push notification.

14. The system of claim 13, wherein the push notification is a content-available push notification.

15. The system of claim 9, wherein the home management controller is included in a smart-home environment.

16. The system of claim 15, wherein the status of the particular device is included in an occupancy estimate of the smart-home.

* * * * *